Oct. 13, 1942.                J. H. DOWELL                2,298,875
                        CO-ORDINATE MEASURING MEANS
                          Filed July 8, 1941           2 Sheets-Sheet 1
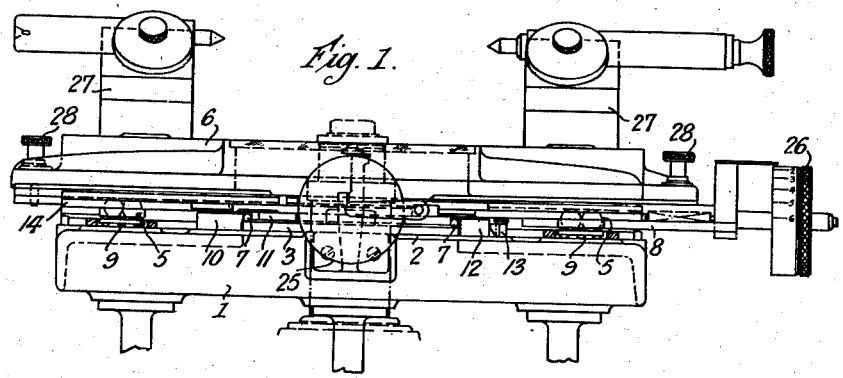
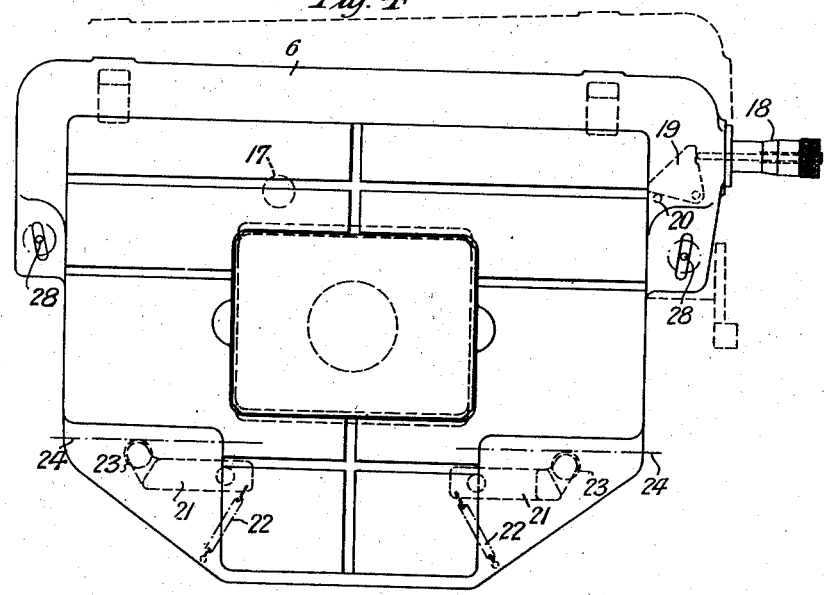
Inventor:
John Hendri Dowell;
By his attorneys,
Baldwin & Wight

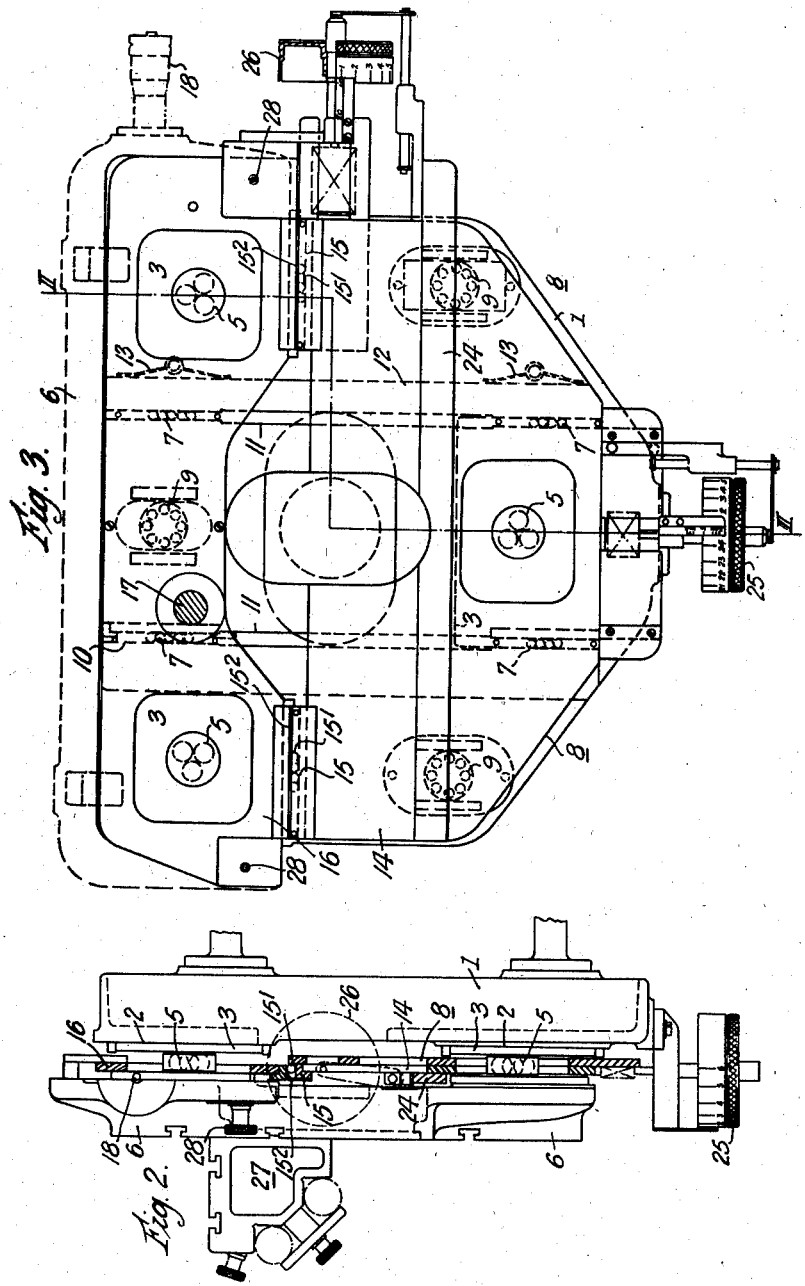

Patented Oct. 13, 1942

2,298,875

UNITED STATES PATENT OFFICE 2,298,875

COORDINATE MEASURING MACHINE

John Hendri Dowell, London, England, assignor to Adam Hilger Limited, London, England Application July 8, 1941, Serial No. 401,527
In Great Britain May 14, 1940

5 Claims. (Cl. 33—174)

In measuring machines in which measurements are made in two directions usually at right angles to each other, two slides and carriages are employed, one slide and carriage being mounted on the carriage of the lower slide. In machines intended for accurate measurement great precision is required in the straightness and planeness of the bearing surfaces of the slides and carriages, and the two slides must be very accurately set at the desired angle to each other, usually 90°, all of which involves a great deal of high precision work.

The object of this invention is to reduce the requirement of such a high precision in the working surfaces and to adopt a form of construction in which the necessary surfaces which restrain the directions of motion of the carriage are all of a kind which can easily be made true planes by simple means, and the correction of one surface will modify the motion only in the direction for which the said surface is desired to act as a restraint. Another object is to bring the measuring plane comparatively near to the axis of the micrometer screws so that the necessity of additional precision of the surfaces is reduced.

Stated another way, the primary object is to ensure that for a given precision of working surfaces, a greater precision in measurement can be attained in a less costly manner.

According to the invention, a measuring machine in which measurements in any two directions at an angle can be made comprises a carriage mounted on a base the direction of movement of which carriage is controlled by an intermediate piece with two straight surfaces at 90° or other desired angle to each other bearing against corresponding straight surfaces on the carriage and base plate respectively. In such construction all the bearing and locating surfaces may be made plane.

More particularly described the invention consists essentially of three main elements, a plane surface forming a base for the machine, a carriage mounted on the base surface, and an intermediate piece consisting of two straight edges at 90° or any desired angle to each other. The bearing surface of the carriage is plane and parallel to its upper surface forming the stage on which the specimen will be mounted. If unrestrained this carriage is free to move in any direction in the plane of its bearing faces.

The drawings illustrate one form of the invention applied to the measuring table of a toolmaker's projector.

Figure 1 is a front elevation.

Figure 2 is an end elevation partly in section on the line II—II.

Figure 3 is a plan with the carriage removed.

Figure 4 is a plan of the carriage.

The apparatus comprises three main elements, a plane surface forming the base, a carriage mounted on the base surface, and an intermediate piece comprising two straight edges.

In the drawings 1 is the base having a plane surface 2 on which are mounted plates 3 which support large balls 5 supporting the carriage 6, and directly mounted on the base 1 are three sets of balls 9 which support the intermediate piece 8.

Mounted on the base 1 is a straight edge 10 against which the cross piece 11 of the intermediate piece 8 engages, balls 7 being interposed between the two surfaces. Contact is maintained between these two surfaces by means of a bar 12 being urged by springs 13 into contact with the other edge of the cross piece 11 through the intermediary of further balls 7. Thus the intermediate piece 8 is allowed a cross motion between the straight edge 10 and spring bar 12. An upper plate 14 which forms part of the intermediate piece 8 is provided with working surfaces 15 at 90° angles to the working surfaces on the cross piece 11. Balls 15' are interposed between the working surface 15 and the working surface 15² provided on a carriage plate 16 which is pivoted at 17 to the underside of the carriage 6, this enabling the carriage to be rotated about the pivot 17.

The rotation is controlled by a screw 18 mounted on the carriage 6 operating against a lever 19 pivoted to the carriage 6 and engaging a pin 20 attached to the carriage plate 16. The carriage plate 16 is kept in contact with the plate 14 by means of two levers 21, springs 22 and rollers 23 which are provided underneath the carriage 6, the rollers bearing against a bar 24 attached to the upper plate 14 of the intermediate piece 8.

Since the pivot 17 of the carriage plate 16 is to one side of the central position of the carriage a turning motion is applied to the carriage 6 by means of which the lever 19 and pin 20 are maintained in contact with the screw 18, screws 28 being provided which pass through slots in the carriage 6 and screw into the carriage plate 16 whereby the carriage plate can be clamped to the carriage 6.

Cross motion of the carriage 6 is controlled by the micrometer 25 and longitudinal motion by the micrometer 26. The carriage 6 is provided with holders 27 for supporting the work.

All the working surfaces are plane and consequently comparatively easily finished to the desired precision, and furthermore, the modification of the surface of any one of the restraining straightedges will modify the motion in the direction in which the straightedge offers a restraint without modification of the motion in any other direction.

The provision for rotating the carriage in addition to moving it in two directions at an angle to the base has the advantage that work which is mounted on the carriage 6 may be adjusted so that the work may be set parallel with one of the directions of the carriage motion. This is particularly convenient in the case of tapered pieces which are supported between centres, the rotation of the carriage enabling the tapered contour of the work to be set at an angle corresponding to the taper, and finally to adjust the contour exactly parallel with the direction of motion.

In the use of the apparatus an object is examined either by a microscope or by a projection system by means of which an enlarged image of the object (to be measured) is projected on to a screen. In either case the image of the object is located by a fine cross line, in the case of a microscope the cross line is in the focal plane of the eyepiece and in the case of the screen the crossline is ruled on it. Measurements are made by traversing the carriage 6 of the measuring machine on which the object to be measured is indicated and setting the enlarged image of the edge or outline from which measurement is to be made, up against the cross line. The corresponding readings of the micrometers 25 and 26 by which the two motions of the carriage are controlled are noted, and the carriage 6 is traversed to the next point to which measurement is to be made, by one or both micrometers, the setting on the image of this point being made against the cross line as before.

The difference between the first and second micrometer readings is the amount by which the carriage is traversed in the two directions at right angles and is thus the desired co-ordinate measurements of the piece under test.

One position for the pivot point 17 about which the carriage 6 rotates would be directly underneath and at one end of the contour of the work which is to be made parallel with the direction of motion, since in this position the carriage 6 can be traversed until the point of the work above the centre of the carriage rotation is on the axis of the optical system, by which a specimen to be measured is observed and the setting for measurement made. The carriage is then traversed to the other end of the work and the contour brought on to the axis by the screw 18 adjusted to the carriage. Since the other end of the work is above the centre of rotation 17 of the carriage 6, no alteration in position will take place when the carriage is rotated. In practice it is not usually possible to arrange for the centre of rotation to be directly underneath the contour of the work, but it will serve equally well if the centre of rotation is arranged on a line normal to the direction, and near one end of the motion of the carriage. The contour of the work will then be tangential to a radius from the centre of the carriage motion, and by first setting the contour of the work on the optical axis of the system by means of one of the motions at right angles to the contour, the contour can be brought on to the optical axis at the other end of the motion with only slight alteration in the first setting.

When the pivot point is arranged towards one end of the straight edge it will be preferable to arrange the adjusting screw by means of which the straight edge is rotated relative to the carriage, at the other end of the straight edge. Since however the spring pressure or other means by which the straight edge is kept in contact with the straightedge of the intermediate member 8, will preferably be arranged at each end, there will thus be a turning movement due to the pivot point being arranged towards one end straight edge and this turning movement can be made use of to maintain contact between the straight edge and with the screw by means of which rotational adjustment is made.

What I claim is:

1. A machine for making measurements in two directions at an angle comprising a base; a carriage for supporting an object to be measured; a first intermediate piece; means guiding the first intermediate piece to move in a first direction on said base; a second intermediate piece; means guiding said second intermediate piece to move on said first intermediate piece in a direction at an angle to said first direction; means mounting said carriage for angular movement relative to said second intermediate piece; means for maintaining said carriage in angularly adjusted position; and means independent of said intermediate pieces for supporting said carriage directly on said base for movement on said base under control of said intermediate pieces.

2. A machine as set forth in claim 1 in which the means for guiding one of said intermediate pieces comprises a straight surface on said intermediate piece; a parallel straight surface on the part on which said intermediate piece is guided; and spring means for maintaining said straight surfaces in cooperative parallel relationship.

3. A machine as set forth in claim 1 comprising means for adjusting the angular position of the carriage, said means including a screw for urging the carriage in one angular direction and spring means acting in opposition to the screw and urging the carriage in the opposite angular direction.

4. A machine as set forth in claim 1 comprising means for adjusting the angular position of the carriage, said means including a screw interposed between the carriage and the second intermediate piece for urging the carriage in one angular direction and spring means interposed between the carriage and the first intermediate piece acting in opposition to the screw and urging the carriage in the opposite direction.

5. A machine as set forth in claim 1 including separate operating means for respectively and independently moving the first intermediate piece on said base in the first direction, moving the second intermediate piece on said first intermediate piece in the direction at an angle to said first direction, and moving said carriage angularly with respect to said base and said intermediate pieces.

JOHN HENDRI DOWELL.